US012647363B2

(12) United States Patent
Alaettinoglu et al.

(10) Patent No.: US 12,647,363 B2
(45) Date of Patent: Jun. 2, 2026

(54) MINIMAL SID DEPTH FOR RING TOPOLOGIES IN SEGMENT ROUTING VIA A PCE AND FLEX-ALGO

(71) Applicant: Ciena Corporation, Hanover, MD (US)

(72) Inventors: Cengiz Alaettinoglu, Sherman Oaks, CA (US); Amal Karboubi, Oshawa (CA)

(73) Assignee: Ciena Corporation, Hanover, MD (US)

( * ) Notice: Subject to any disclaimer, the term of this patent is extended or adjusted under 35 U.S.C. 154(b) by 484 days.

(21) Appl. No.: 18/131,210

(22) Filed: Apr. 5, 2023

(65) Prior Publication Data

US 2024/0340241 A1      Oct. 10, 2024

(51) Int. Cl.
| | |
|---|---|
| *H04L 47/125* | (2022.01) |
| *H04L 41/12* | (2022.01) |
| *H04L 45/00* | (2022.01) |
| *H04L 47/10* | (2022.01) |

(52) U.S. Cl.
CPC ............ *H04L 47/125* (2013.01); *H04L 41/12* (2013.01); *H04L 45/34* (2013.01); *H04L 47/13* (2013.01)

(58) Field of Classification Search
CPC ......... H04L 12/42; H04L 45/50; H04L 41/12; H04L 45/34; H04L 45/02; H04L 12/437; H04L 45/22; H04L 45/566; H04L 45/04
See application file for complete search history.

(56) References Cited

U.S. PATENT DOCUMENTS

| | | | |
|---|---|---|---|
| 7,120,792 | B1 | 10/2006 | Jacobson et al. |
| 7,197,573 | B1 | 3/2007 | Jacobson et al. |

| | | | |
|---|---|---|---|
| 8,135,834 | B1 | 3/2012 | Jacobson et al. |
| 8,274,901 | B1 | 9/2012 | Casner et al. |
| 8,422,502 | B1 | 4/2013 | Alaettinoglu et al. |

(Continued)

FOREIGN PATENT DOCUMENTS

| | | |
|---|---|---|
| EP | 3 813 310 A1 | 4/2021 |
| WO | 2021067231 A1 | 4/2021 |
| WO | 2022055861 A1 | 3/2022 |

OTHER PUBLICATIONS

S. Hegde et al., "Flexible Algorithms: Bandwidth, Delay, Metrics and Constraints," Spring Internet-Draft, Standards Track, Mar. 23, 2022, 27 Pages.

(Continued)

*Primary Examiner* — Mahran Y Abu Roumi
(74) *Attorney, Agent, or Firm* — Baratta Law PLLC; Lawrence A. Baratta, Jr.

(57) ABSTRACT

Systems and methods, associated with a Segment Routing network including a plurality of nodes in a ring, include defining a first Flexible Algorithm having one or more first constraints for links in the ring to force traffic to flow in a first direction around the ring; and defining a second Flexible Algorithm having one or more second constraints for of the links in the ring to force traffic to flow in a second direction around the ring. A Path Computation Engine (PCE) is configured to group links on the computed path to the one or more rings, for each ring, determine a direction on an associated ring and assign the grouped links on the associated ring with a Flex-Algo SID for a final node in the determined direction, and provide a SID list that includes the Flex-Algo SIDs for the one or more rings, to a source node in a Segment Routing network.

20 Claims, 5 Drawing Sheets

CLOCKWISE FLEX-ALGO
LINK COLOR

COUNTERCLOCKWISE FLEX-ALGO
LINK COLOR

(56) References Cited

U.S. PATENT DOCUMENTS

| | | | |
|---|---|---|---|
| 8,824,331 B1 | 9/2014 | Alaettinoglu et al. | |
| 8,937,946 B1 | 1/2015 | Kanna et al. | |
| 9,026,674 B1 | 5/2015 | Kanna et al. | |
| 10,033,623 B2 | 7/2018 | Jain et al. | |
| 11,057,278 B1 | 7/2021 | Côté et al. | |
| 11,240,145 B2 | 2/2022 | Kashyap et al. | |
| 2016/0057049 A1 | 2/2016 | Jacobson et al. | |
| 2021/0258249 A1* | 8/2021 | Torvi | H04L 45/566 |
| 2021/0392014 A1* | 12/2021 | Torvi | H04L 12/42 |

OTHER PUBLICATIONS

Jun. 19, 2024, International Search Report and Written Opinion for International Patent Application No. PCT/US2024/021270.

* cited by examiner

CLOCKWISE FLEX-ALGO
LINK COLOR

COUNTERCLOCKWISE FLEX-ALGO
LINK COLOR

CLOCKWISE FLEX-ALGO
LINK METRICS

COUNTERCLOCKWISE FLEX-ALGO
LINK METRICS

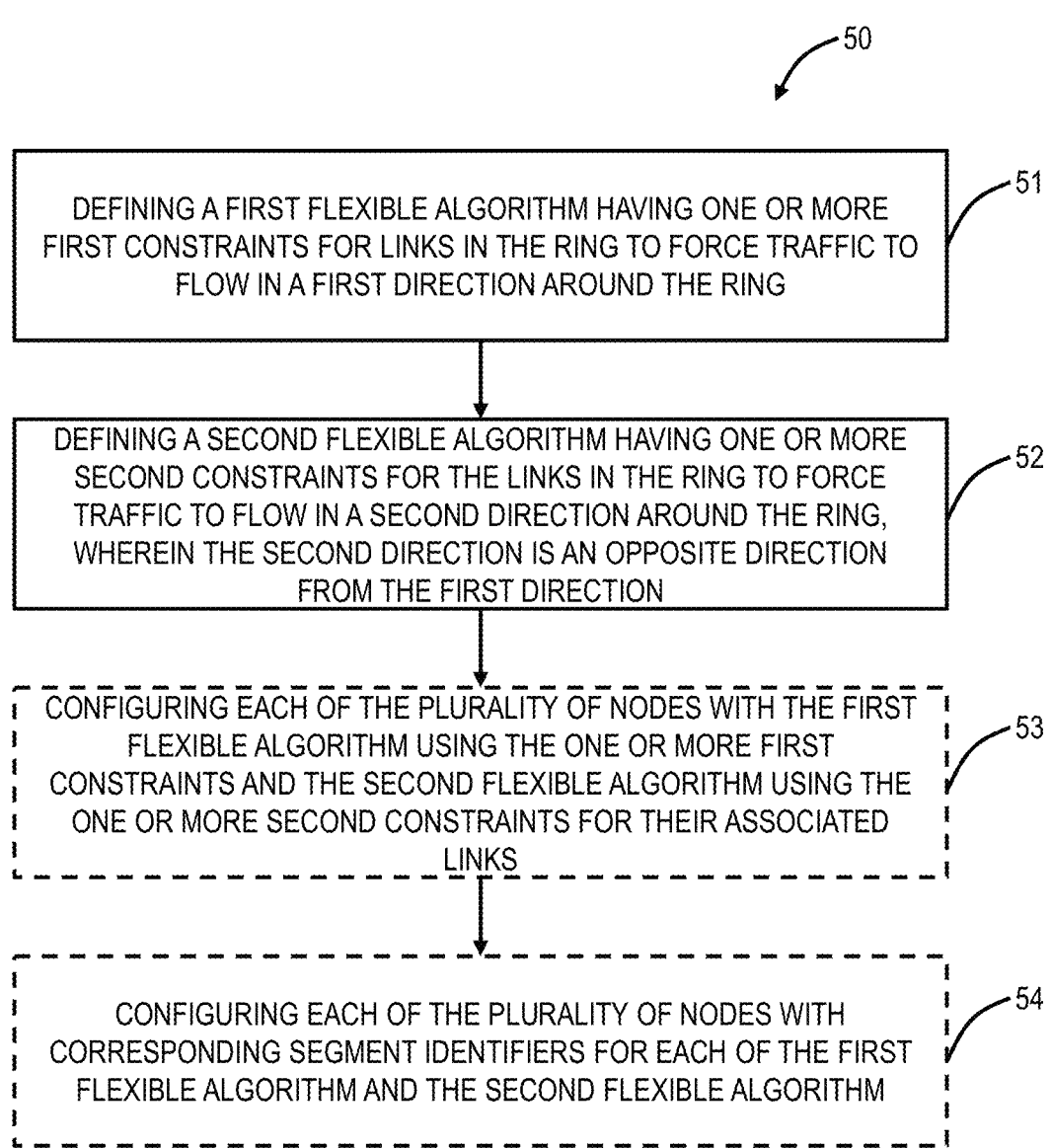

50

DEFINING A FIRST FLEXIBLE ALGORITHM HAVING ONE OR MORE FIRST CONSTRAINTS FOR LINKS IN THE RING TO FORCE TRAFFIC TO FLOW IN A FIRST DIRECTION AROUND THE RING

51

DEFINING A SECOND FLEXIBLE ALGORITHM HAVING ONE OR MORE SECOND CONSTRAINTS FOR THE LINKS IN THE RING TO FORCE TRAFFIC TO FLOW IN A SECOND DIRECTION AROUND THE RING, WHEREIN THE SECOND DIRECTION IS AN OPPOSITE DIRECTION FROM THE FIRST DIRECTION

52

CONFIGURING EACH OF THE PLURALITY OF NODES WITH THE FIRST FLEXIBLE ALGORITHM USING THE ONE OR MORE FIRST CONSTRAINTS AND THE SECOND FLEXIBLE ALGORITHM USING THE ONE OR MORE SECOND CONSTRAINTS FOR THEIR ASSOCIATED LINKS

53

CONFIGURING EACH OF THE PLURALITY OF NODES WITH CORRESPONDING SEGMENT IDENTIFIERS FOR EACH OF THE FIRST FLEXIBLE ALGORITHM AND THE SECOND FLEXIBLE ALGORITHM

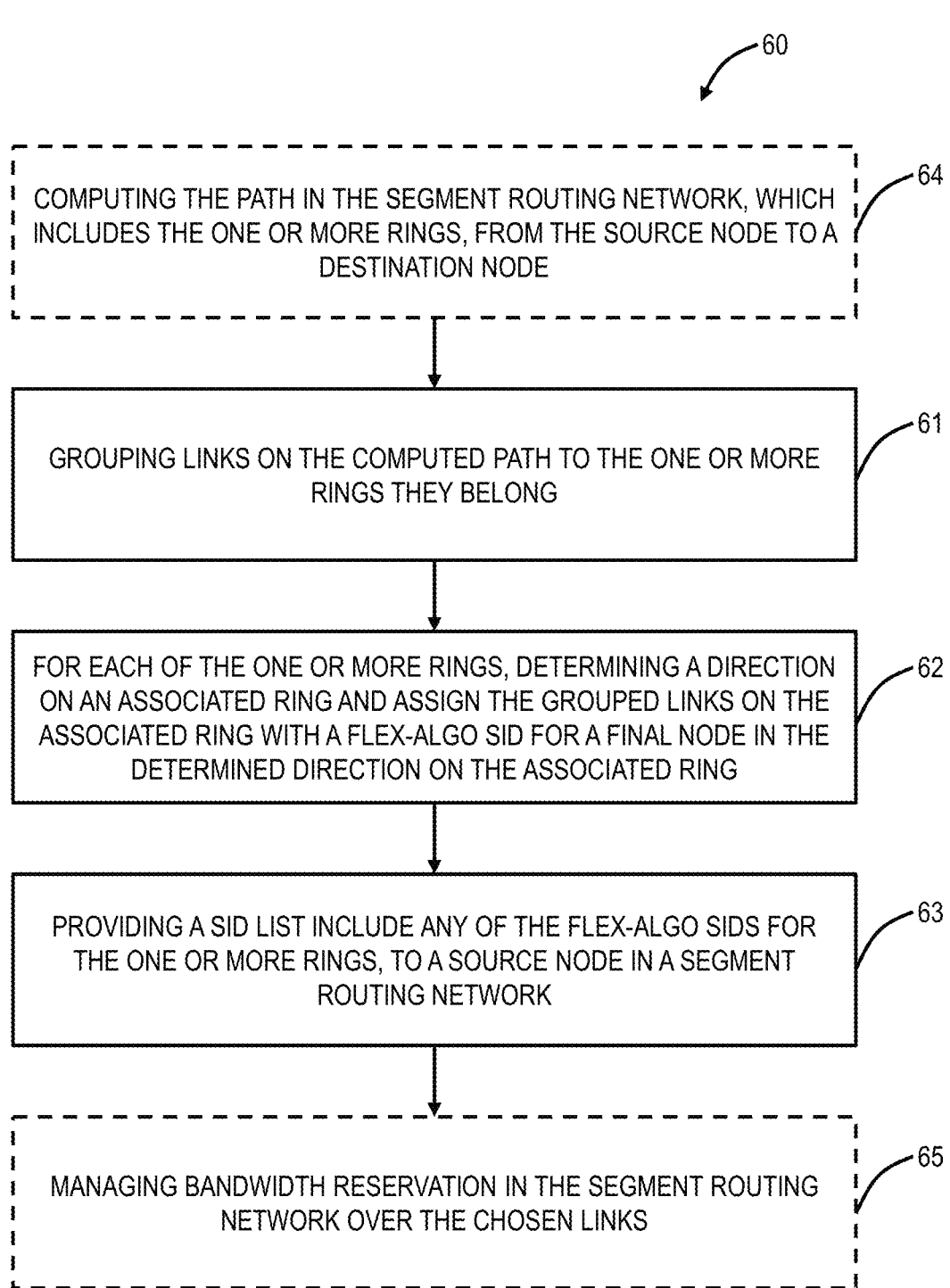

60

COMPUTING THE PATH IN THE SEGMENT ROUTING NETWORK, WHICH INCLUDES THE ONE OR MORE RINGS, FROM THE SOURCE NODE TO A DESTINATION NODE

64

GROUPING LINKS ON THE COMPUTED PATH TO THE ONE OR MORE RINGS THEY BELONG

61

FOR EACH OF THE ONE OR MORE RINGS, DETERMINING A DIRECTION ON AN ASSOCIATED RING AND ASSIGN THE GROUPED LINKS ON THE ASSOCIATED RING WITH A FLEX-ALGO SID FOR A FINAL NODE IN THE DETERMINED DIRECTION ON THE ASSOCIATED RING

62

PROVIDING A SID LIST INCLUDE ANY OF THE FLEX-ALGO SIDS FOR THE ONE OR MORE RINGS, TO A SOURCE NODE IN A SEGMENT ROUTING NETWORK

63

MANAGING BANDWIDTH RESERVATION IN THE SEGMENT ROUTING NETWORK OVER THE CHOSEN LINKS

SR POLICY
  CANDIDATE PATH 1: B1, D1, Z1
  CANDIDATE PATH 2: C2, E2, Z2

WHERE N1 IS CLOCKWISE SID AND N2 IS A COUNTERCLOCKWISE SID FOR NODE N

MINIMAL SID DEPTH FOR RING TOPOLOGIES IN SEGMENT ROUTING VIA A PCE AND FLEX-ALGO

FIELD OF THE DISCLOSURE

The present disclosure relates generally to networking and computing. More particularly, the present disclosure relates to systems and methods for minimal Segment Identifier (SID) depth for ring topologies in Segment Routing via a Path Computation Element (PCE) and Flex-Algo.

BACKGROUND OF THE DISCLOSURE

Segment Routing (SR) is a technology that implements a source routing paradigm. A packet header includes a stack of function identifiers, known as segments, which define an ordered list of functions to be applied to the packet. A segment can represent any instruction, topological, or service-based, and each Segment is represented by a Segment Identifier (SID). A segment can have a local semantic to an SR node or global within an SR domain. These functions include, but are not limited to, the forwarding behaviors to apply successively to the packet, notably destination-based unicast forwarding via a sequence of explicitly enumerated nodes (domain-unique node segments) and links (adjacency segments), and the like. SR allows forcing a flow through any topological path and service chain while maintaining a per-flow state only at the ingress node to the SR domain. Segment Routing is described, e.g., in Fiflsfils et al., RFC 8402, "Segment Routing Architecture," Internet Engineering Task Force (IETF), July 2018, the contents of which are incorporated herein by reference. In Segment Routing, a path includes segments which are instructions a node executes on an incoming packet.

BRIEF SUMMARY OF THE DISCLOSURE

The present disclosure relates to systems and methods for minimal Segment Identifier (SID) depth for ring topologies in Segment Routing via a Path Computation Element (PCE) and Flex-Algo. The objective of Flex-Algo is to create a new plane in the network. Flex-Algo is typically used to compute constrained paths in a distributed fashion. One of its side effects is that for those constraints in the algorithm, the segment routed path contains only one SID, the SID for the destination in the Flex-Algo plane. This is because it forces all the intermediate routers along the path to also compute this constrained path and create entries in their forwarding tables for it. A major drawback of Flex-Algo, on the other hand, is that it cannot deal with bandwidth reservations. For this, a PCE-based path computation is required.

Many access and aggregation networks include rings (and ring of rings). Here, Service Providers (SPs) desire circuit-style service paths where the service has diverse paths for resiliency and with strict bandwidth management along the links. The IETF solution for circuit-style segment routing lists an adjacency SID for each link along the service's path (see "Circuit Style Segment Routing Policies," draft-sch-mutzer-pce-cs-sr-policy, May 5, 2022, the contents of which are incorporated by reference in their entirety). This can lead to a very large SID stack as services cross multiple rings typically (3 rings with 10 or so hops in each ring is common). The head-end router may not be able to push that many SIDs to the packets. Even the highest end routers have a SID depth limitation (say, e.g., on the order of 9-20 SIDs). On top of it, the rings are getting bigger as cell sites are getting denser (e.g., 5G mobile is expected to have 10 times the number of cell sites as 4G mobile).

In the present disclosure, we separate constrained path computation with diversity and bandwidth management aspect of service paths from the compression of the resulting label stack. A PCE is used for the former and Flex-Algo for the latter. The PCE uses SR Policy in the head-end but provides candidate paths which are compressed using a Flex-Algo prefix SIDs and needing only one SID per ring. The present disclosure uses Flex-Algo to compress SID lists with application to rings and using it along with a centralized PCE to achieve diversity and bandwidth constraints with an optimized SID depth. Bandwidth constraints are handled by running a centralized PCE. Advantageously, the present disclosure uses a single SID per ring, e.g., with typical 3 adjacent rings, a segment routed path can be encoded as 3 SIDs. This is for all practical purposes a constant, namely one SID per ring.

In an embodiment, the present disclosure includes a method having steps and a non-transitory computer-readable medium with instructions that, when executed, cause one or more processors to implement the steps. Further, the method and non-transitory computer-readable medium is for a Segment Routing network including a plurality of nodes in a ring. The steps include defining a first Flexible Algorithm having one or more first constraints for links in a ring to force traffic to flow in a first direction around the ring, wherein the ring is formed by a plurality of nodes included in a Segment Routing network; and defining a second Flexible Algorithm having one or more second constraints for the links in the ring to force traffic to flow in a second direction around the ring, wherein the second direction is an opposite direction from the first direction.

The one or more first constraints and the one or more second constraints can utilize link affinities. The link affinities for a given link can be the same for each of the first Flexible Algorithm and the second Flexible Algorithm, and wherein each of the first Flexible Algorithm and the second Flexible Algorithm treat a given link affinity in an opposite manner. The one or more first constraints and the one or more second constraints can be Traffic Engineering (TE) link metrics that are defined separately for each of the first Flexible Algorithm and the second Flexible Algorithm. In a preferred direction, the TE link metrics can be assigned a nominal value, and, in an opposite direction, the TE link metrics can be assigned an arbitrarily high value or omitted.

Each of the plurality of nodes in the ring can be configured to advertise associated attributes, for the first constraints and the second constraints, of locally attached links, to other nodes in the ring. The steps can further include configuring each of the plurality of nodes with one or more of the first Flexible Algorithm using the one or more first constraints and the second Flexible Algorithm using the one or more second constraints. The steps can further include configuring each of the plurality of nodes with corresponding Segment Identifiers for each of the first Flexible Algorithm and the second Flexible Algorithm.

In another embodiment, the present disclosure includes a Path Computation Element (PCE) which can include a PCE method having steps, a processing device configured to implement the steps, and a non-transitory computer-readable medium with instructions that, when executed, cause one or more processors to implement the steps. The steps include grouping links on the computed path to the one or more rings they belong; for each of the one or more rings, determining a direction on an associated ring and assign the grouped links on the associated ring with a Flex-Algo SID for a final node in the determined direction on the associated ring; and providing a SID list that includes the one or more Flex-Algo SIDs for the respective one or more rings, to a source node in a Segment Routing network.

For determination of a Segment Identifier (SID) list for one or more rings in a computed path, the steps can further include computing the path in the Segment Routing network, which includes the one or more rings, from the source node to a destination node, and providing a SID for any other links on the computed path exclusive of the one or more rings. The steps can further include managing bandwidth reservation in the Segment Routing network over the chosen links.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a process for creating a prefix SIDs for a ring using Flex-Algo definition according to an embodiment of the present disclosure.

FIG. 4 is a flowchart of a process implemented by a PCE for path computation and SID compression according to an embodiment of the present disclosure.

DETAILED DESCRIPTION OF THE DISCLOSURE

Figure 1:
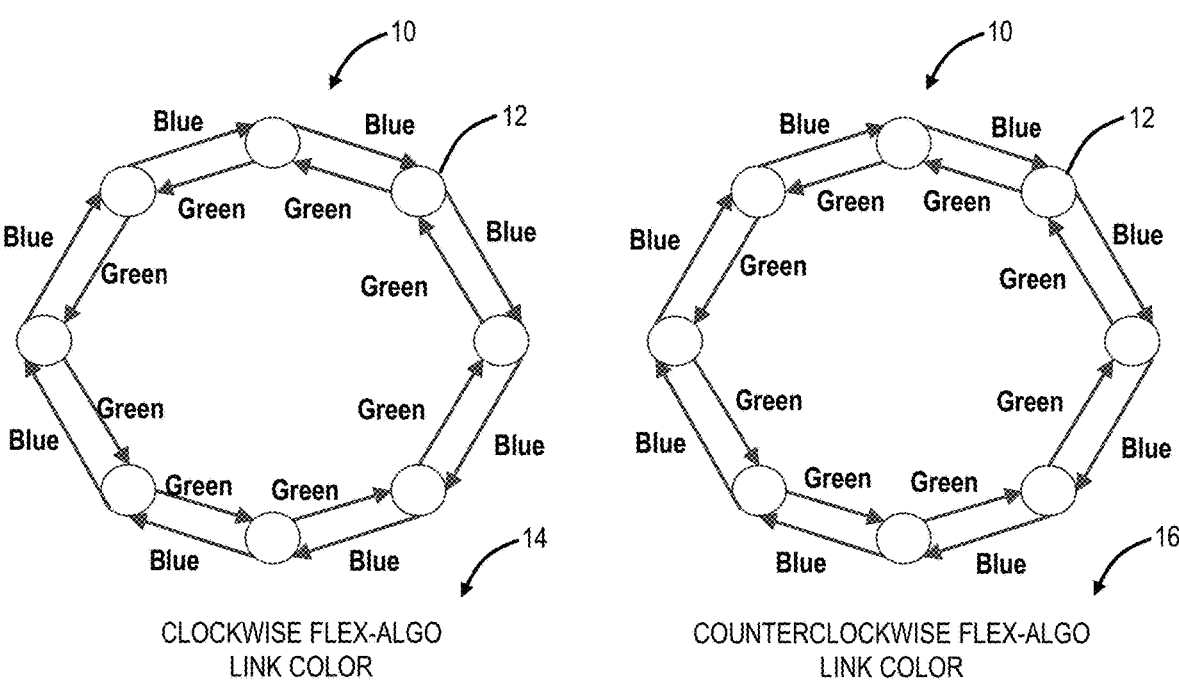
FIG. 1 is a diagram of a ring of various nodes and with link colors (affinities) for two different Flex-Algos.

Again, the present disclosure relates to systems and methods for minimal Segment Identifier (SID) depth for ring topologies in Segment Routing via a Path Computation Element (PCE) and Flex-Algo.

Segment Routing Overview

A particular attraction of Segment Routing is that it obviates the need to install and maintain any end-to-end (e2e) path state in the core network. Only the ingress node for a particular flow needs to hold the segment stack, which is applied as the header of every packet of that flow, to define its route through the network. This makes Segment Routing particularly suited to control by a Software-Defined Networking (SDN) model.

Segment Routing can be directly applied to Multiprotocol Label Switching (MPLS) with no change in the forwarding plane. A segment is encoded as an MPLS label. An ordered list of segments is encoded as a stack of labels. The segment to process is on the top of the stack. Upon completion of a segment, the related label is popped from the stack. Segment Routing can also be applied to the Internet Protocol (IP) v6 architecture, with a new type of routing extension header—for example, the document published in July 2015 as draft-previdi-6man-segment-routing-header (available online at tools.ietf.org/html/draft-previdi-6man-segment-routingheader-08) and RFC 8754, "IPv6 Segment Routing Header (SRH)," March 2020, the contents of both are incorporated by reference. A segment is encoded as an IPv6 address. An ordered list of segments is encoded as an ordered list of IPv6 addresses in the routing extension header. The Segment to process at any point along the path through the network is indicated by a pointer in the routing extension header. Upon completion of a segment, the pointer is incremented. Segment Routing can also be applied to Ethernet, e.g., IEEE 802.1 and variants thereof. There are various benefits asserted for SR, including, for example, scalable end-to-end policy, easy incorporation in IP and SDN architectures, operational simplicity, a balance between distributed intelligence, centralized optimization, and application-based policy creation, and the like.

In loose source routing such as Segment Routing, a source node chooses a path or is provided a path by a Software Defined Networking (SDN) controller or PCE, and encodes the chosen path in a packet header as an ordered list of segments. The rest of the network executes the encoded instructions without any further per-flow state. Segment Routing provides full control over the path without the dependency on network state or signaling to set up a path. This makes Segment Routing scalable and straightforward to deploy. Segment Routing (SR) natively supports both IPv6 (SRv6) and MPLS (SR-MPLS) forwarding planes and can co-exist with other transport technologies, e.g., Resource Reservation Protocol (RSVP)-Traffic Engineering (RSVP-TE) and Label Distribution Protocol (LDP).

In Segment Routing, a path includes segments which are instructions a node executes on an incoming packet. For example, segments can include forward the packet according to the shortest path to the destination, forward through a specific interface, or deliver the packet to a given application/service instance). Each Segment is represented by a Segment Identifier (SID). All SIDs are allocated from a Segment Routing Global Block (SRGB) with domain-wide scope and significance, or from a Segment Routing Local Block (SRLB) with local scope. The SRGB includes the set of global segments in the SR domain. If a node participates in multiple SR domains, there is one SRGB for each SR domain. In SRv6, the SRGB is the set of global SRv6 SIDs in the SR domain.

A segment routed path is encoded into the packet by building a SID stack that is added to the packet. These SIDs are popped by processing nodes, and the next SID is used to decide forwarding decisions. A SID can be one of the following types an adjacency SID, a prefix SID, a node SID, a binding SID, and an anycast SID. Each SID represents an associated segment, e.g., an adjacency segment, a prefix segment, a node segment, a binding segment, and an anycast segment.

An adjacency segment is a single-hop, i.e., a specific link. A prefix segment is a multi-hop tunnel that can use equal-cost multi-hop aware shortest path links to reach a prefix. A prefix SID can be associated with an IP prefix. The prefix SID can be manually configured from the SRGB and can be distributed by Open Shortest Path First (OSPF) or Intermediate System-Intermediate System (ISIS). The prefix segment steers the traffic along the shortest path to its destination. A node SID is a special type of prefix SID that identifies a specific node. It is configured under the loopback interface with the loopback address of the node as the prefix. A prefix segment is a global segment, so a prefix SID is globally unique within the segment routing domain. An adjacency segment is identified by a label called an adjacency SID, which represents a specific adjacency, such as egress interface, to a neighboring router. The adjacency SID is distributed by ISIS or OSPF. The adjacency segment steers the traffic to a specific adjacency.

A binding segment represents an SR policy. A head-end node of the SR policy binds a Binding SID (BSID) to its policy. When the head-end node receives a packet with an active segment matching the BSID of a local SR Policy, the head-end node steers the packet into the associated SR Policy. The BSID provides greater scalability, network opacity, and service independence. Instantiation of the SR Policy may involve a list of SIDs. Any packets received with an active segment equal to BSID are steered onto the bound SR Policy. The use of a BSID allows the instantiation of the policy (the SID list) to be stored only on the node or nodes that need to impose the policy. The direction of traffic to a node supporting the policy then only requires the imposition of the BSID. If the policy changes, this also means that only the nodes imposing the policy need to be updated. Users of the policy are not impacted. The BSID can be allocated from the local or global domain. It is of special significance at the head-end node where the policy is programmed in forwarding.

SR Traffic Engineering (SR-TE) provides a mechanism that allows a flow to be restricted to a specific topological path, while maintaining per-flow state only at the ingress node(s) to the SR-TE path. It uses the Constrained Shortest Path First (CSPF) algorithm to compute paths subject to one or more constraint(s) (e.g., link affinity) and an optimization criterion (e.g., link latency). An SR-TE path can be computed by a head-end of the path whenever possible (e.g., when paths are confined to single IGP area/level) or at a Path Computation Element (PCE) (e.g., when paths span across multiple IGP areas/levels).

SR Flex-Algo

SR Flex-Algo is described in RFC 9350, "IGP Flexible Algorithm," February 2023, and RFC 9351, "Border Gateway Protocol-Link State (BGP-LS) Extensions for Flexible Algorithm Advertisement," February 2023, the contents of each are incorporated by reference in their entirety. The objective of Flex-Algo is to create a new plane in the network. Note, as described herein Flex-Algo is the same as Flexible Algorithm. Flex-Algo is called so because it allows a user the flexibility to define:

(1) the type of calculation to be used (e.g., shortest path), (2) the metric type to be used (e.g., Interior Gateway Protocol (IGP) metric, Traffic Engineering (TE) metric, delay, etc.), and/or (3) the set of constraints to be used (e.g., inclusion or exclusion of certain links using affinities).

Application-Specific Link Attributes

Application-specific link attributes (ASLA) are described in RFC 8919, "IS-IS Application-Specific Link Attributes," October 2020, and RFC 8920, "OSPF Application-Specific Link Attributes," October 2020, the contents of each are incorporated by reference in their entirety. Of note, Sec. 12 in RFC 9350 describes the advertisement and use of ASLA with Flex-Algo.

Flex-Algo for Rings

Figure 2:
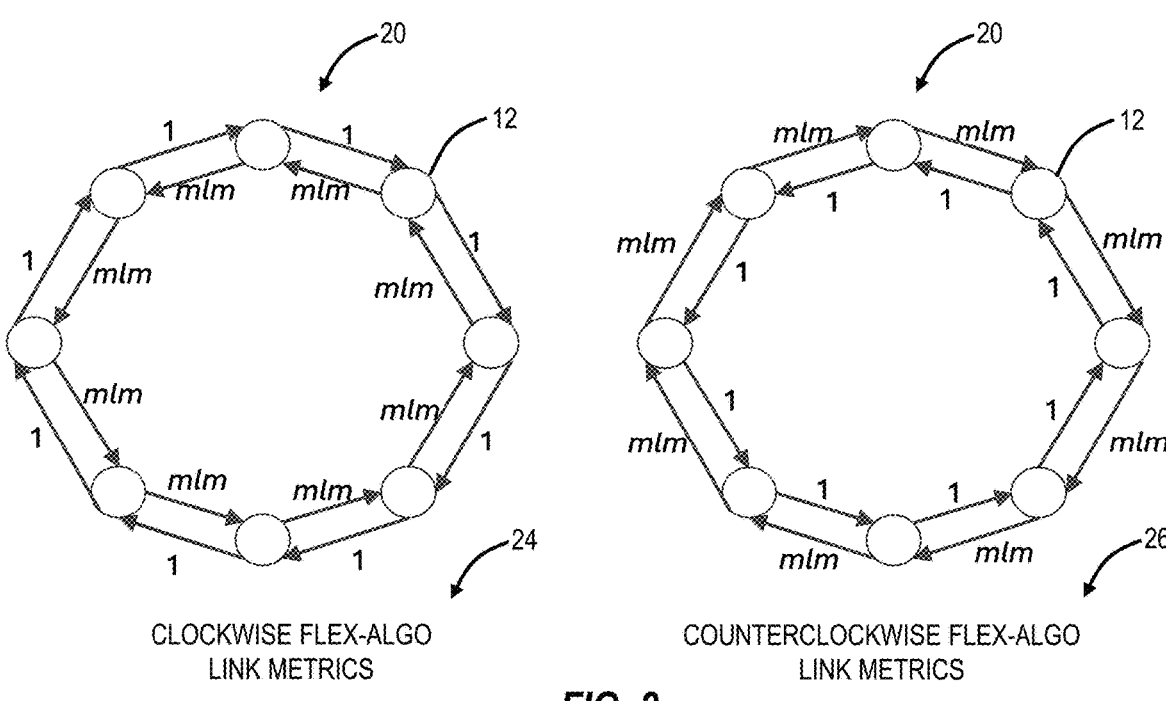
FIG. 2 is a diagram of a ring of various nodes and with link metrics for two different Flex-Algos.
Figure 6:
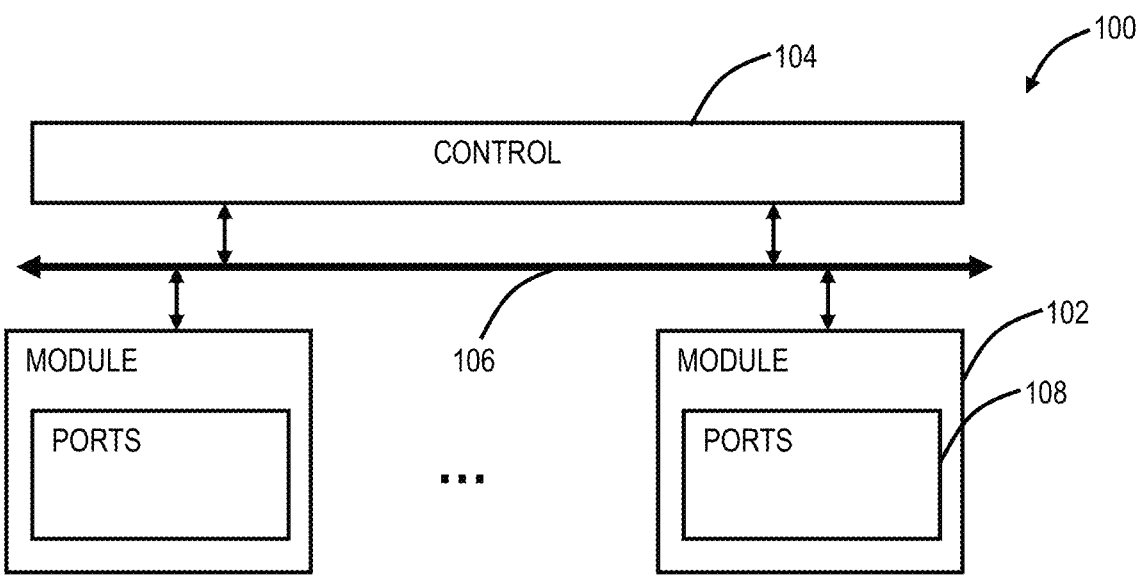
FIG. 6 is a block diagram of an example implementation of a router.

A ring in a network means all nodes are interconnected to one another via two links and traffic can flow in a clockwise or counterclockwise direction. Of course, these terms clockwise or counterclockwise direction are logical terms, i.e., a ring does not have to be a circle, oval, etc. The terms clockwise or counterclockwise direction mean one direction around the ring and an opposite direction around the ring. That is, these do not have to be literally clockwise or counterclockwise in a geographic sense. Rather, one can be assigned arbitrarily and the other is merely the opposite direction. Note, while real networks have physical layouts, the present disclosure focuses on the logical view of the ring where the topology is shown in a logical sense (see FIGS. 1 and 2, where rings 10, 20 are shown as perfect circles with each link have identical distances). FIG. 1 is a diagram of a ring 10 of various nodes 12 and with link colors (affinities) for two different Flex-Algos 14, 16. FIG. 2 is a diagram of a ring 20 of various nodes 12 and with link metrics for two different Flex-Algos 24, 26. The nodes 12 are routers, and an example of which is illustrated in FIG. 6.

Generally, the present disclosure has two different Flex-Algo definitions—one for a clockwise direction, and another for a counterclockwise direction. The objective of each of the different Flex-Algo definitions is to use constraints that force traffic in a given direction around the ring 10, 20. As such, a destination on the ring 10, 20 can be designated by a single SID that guarantees transit over the ring in a specified direction. That is, there is a first SID for a node for the first Flex-Algo definition and a second SID for the node for the second Flex-Algo definition.

Specifically, Flex-Algo defines new prefix segments defined by prefix SIDs with specific optimization objectives and constraints. The diversity on the ring 10, 20 requires two paths: one clockwise and one counterclockwise. To simplify and minimize the SID list depth for traversing the ring 10, 20, the present disclosure proposes use of two flex-algo algorithms, one for each direction. Advantageously, the two Flex-Algo definitions allow two SIDs, per node, per ring, namely a prefix SID for a node N in the clockwise direction, say SID N1, and another prefix SID in the counterclockwise direction, say SID N2. With these definitions, a PCE, controller, management system, etc. can define paths between nodes in a ring, as well as between rings, with one prefix SID per ring. This is a minimal definition.

Flex-Algo Implementation

The present disclosure presents two example approaches for realizing the Flex-Algo definitions, one using link affinities and one using link metrics combined with an extension that allows different link metrics for different Flex-Algos.

FIG. 1 illustrates the ring 10 having link affinities, labeled as blue in the clockwise direction and green in the counterclockwise direction, for the different Flex-Algos 14, 16. Again, link affinities are defined under Application-Specific Link Attributes, can be configured for each node 12, and advertised in the ring 10. Link affinities can also be referred to as colors and each link has a specified value. In this example, for illustration purposes, we label each link in the clockwise direction as blue, and each link in the counterclockwise direction as green. As noted in RFC 9350, Sec. 4, "constraints that restrict paths to links with specific affinities or avoid links with specific affinities are also possible," and in Sec. 12, "for example, include or exclude rules based on link affinities can be part of the Flex-Algorithm Definition, as defined in Sections 6 and 7."

In this embodiment, we use the specific affinities to include links, e.g., in the clockwise direction, include blue and/or exclude green, and, in the counterclockwise direction, include green and/or exclude blue. In this manner, every link has the same ASLA, but each of the two different Flex-Algos treat the affinities in an opposite manner, to achieve clockwise and counterclockwise path steering. There can be various implementations with the specific affinities, all of which are contemplated herewith. In one approach, it can be include links with the preferred affinity. In another approach, it can be to exclude links with the non-preferred affinity. In a further approach, it can be a combination of include and exclude.

FIG. 2 illustrates the ring 20 have TE link metrics, for the different Flex-Algos 24, 26. Conventionally in ASLA, TE link metrics are defined under a global application scope, meaning a link would have the same TE metric across all Flex-Algos. However, the present disclosure contemplates an implementation where there is a per Flex-Algo TE link metric. This approach includes setting normal metrics in the desired directions, i.e., either clockwise or counterclockwise, and high metrics or omit its settings in the undesired direction, i.e., the other one. For example, the Flex-Algo 24 has metrics that force traffic in the clockwise direction, we use usual metrics in the clockwise direction (e.g., one for each link), and a really large metric referred to as max-link-metric (mlm) in the reverse direction, i.e., the counterclock-wise direction. As is known in the art, max-link-metric (mlm) is larger than any end-to-end path metric across the network. For example, OSPF and ISIS have this value predefined. The regular metrics can all be thought of as 1s, and reverse link metrics as infinity. In the clockwise algorithm, taking a path in the reverse direction would be very costly, and would only be taken if there was a fault. The counterclockwise algorithm has the metrics, see the Flex-Algo 26, reversed making a path in the clockwise direction very costly.

Note that when a link fails in the ring 20, the use of max-link-metric does not stop the routers switching direction of the traffic for both algorithms. This may be the desired behavior for some networks. A PCE, to satisfy explicit bandwidth management with diversity, may have already reserved bandwidth in both directions. If not, it is possible to stop taking reverse paths by several mechanisms. For example, an SR Policy with an explicit link exclude constraint for the links in the reverse direction can be installed at the head-end routers. This would cause head-end to reject the reverse path. For this, the Constrained Shortest Path First (CSPF) needs to be run using the flex-algo topology. Another approach would configure routers to reject paths that are longer than max-link-metric. When using application specific link attributes, the TE metric for the reverse direction can be omitted instead of advertising a very large value (mlm). This would also disable computing paths in the undesired direction.

Flex-Algo Definition

The present disclosure includes two aspects—(1) Flex-Algo definition for each direction of the ring, and (2) use of the two prefix SIDs for constructing a TE path over each ring. Again, Flex-Algo is defined based on advertisements from routers using IGP (RFC 9350) and/or BGP (RFC 9351). IGP can include ISIS, OSPFv2, OSPFv3, etc. The following describes the definitions from RFC 9350, using IGP. RFC 9350 specifies a set of extensions to ISIS, OSPFv2, and OSPFv3 that enable a router to advertise TLVs that (a) identify a calculation-type, (b) specify a metric-type, and (c) describe a set of constraints on the topology that are to be used to compute the best paths along the constrained topology. A given combination of calculation-type, metric-type, and constraints is known as a "Flexible Algorithm Definition" or FAD. A router that sends such a set of TLVs also assigns a Flex-Algorithm value to the specified combination of calculation-type, metric-type, and constraints. RFC 9350 also specifies a way for a router to use IGPs to associate one or more (i) Segment Routing with the MPLS Data Plane (SR-MPLS) Prefix-SIDs [RFC 8660, "Segment Routing with the MPLS Data Plane, December 2019, the contents of which are incorporated by reference in their entirety] or (ii) Segment Routing over IPv6 (SRv6) locators [RFC 8986, "Segment Routing over IPv6 (SRv6) Network Programming," February 2021, the contents of which are incorporated by reference in their entirety], with a particular Flex-Algo. Each such Prefix-SID or SRv6 locator then represents a path that is computed according to the identified Flex-Algorithm. In SRv6, it is the locator, not the SID, that holds the binding to the algorithm. RFCs 8919 and 8920 define use of the ASLA for link affinities, and Sec. 12 of RFC 9350 discusses use of such affinities in Flex-Algo.

To guarantee loop-free forwarding for paths computed for a particular Flex-Algo, all routers that (a) are configured to participate in a particular Flex-Algo and (b) are in the same Flex-Algo. Accordingly, the definition advertisement scope must agree on the definition of the Flex-Algo.

Process for Creating a Prefix SIDs for a Ring Using Flex-Algo Definition

FIG. 3 is a process 50 for creating a prefix SIDs for a ring using Flex-Algo definition according to an embodiment of the present disclosure. The process 60 can be realized as a method having steps; via a processing system disposed in, associated with, or connected to a router, with the processing system including at least one processor configured to implement the steps; and as a non-transitory computer-readable medium storing instructions that, when executed by at least one processor, cause the at least one processor to implement the steps. The process 50 is associated with a Segment Routing network including a plurality of nodes in a ring.

The process 50 includes defining a first Flexible Algorithm having one or more first constraints for links in the ring to force traffic to flow in a first direction around the ring (step 51); and defining a second Flexible Algorithm having one or more second constraints for the links in the ring to force traffic to flow in a second direction around the ring, wherein the second direction is an opposite direction from the first direction (step 52).

In an embodiment, the one or more first constraints and the one or more second constraints utilize link affinities. The link affinities for a given link can be the same for each of the first Flexible Algorithm and the second Flexible Algorithm, and wherein each of the first Flexible Algorithm and the second Flexible Algorithm can treat a given link affinity in an opposite manner.

In another embodiment, the one or more first constraints and the one or more second constraints can be Traffic Engineering (TE) link metrics that are defined separately for each of the first Flexible Algorithm and the second Flexible Algorithm. In a preferred direction, the TE link metrics can be assigned a nominal value, and, in an opposite direction, the TE link metrics can be assigned an arbitrarily high value.

Each of the nodes in the ring can be configured to advertise associated attributes, for the one or more first constraints and the one or more second constraints, of locally attached links, to other nodes in the ring. The process 50 can further include configuring each of the plurality of nodes with the first Flexible Algorithm using the one or more first constraints and the second Flexible Algorithm using the one or more second constraints for their associated links (step 53). The process 50 can further include configuring each of the plurality of nodes with corresponding Segment Identifiers for each of the first Flexible Algorithm and the second Flexible Algorithm (step 54).

Those skilled in the art will appreciate Segment Routing and Flex-Algo can be used in various different implementations to achieve the functionality described herein. The term one or more first and second constraints are meant to encompass anything in Segment Routing and/or Flex-Algo that can be used to steer traffic. In two examples, one approach is described using link affinities and another approach using TE link metrics that are different for each Flex-Algo. Again, there can be other implementations using metrics, affinities, or any other constraint that forces traffic in one direction on a ring to a given node. Also, the one or more first and second constraints are meant to cover both a single constraint, e.g., only include links in a preferred direction, only exclude links in a non-preferred direction, as well as multiple constraints such as in a Boolean format, e.g., include links in the preferred direction and exclude links in the non-preferred direction.

In addition to the one or more first and second constraints, there are attributes for the links. Again, in the two examples described herein, the attributes can be link color (affinity) or TE link metrics. The attributes are what are advertised and the one or more first and second constraints, associated with each of the first and second Flex-Algo, are how these attributes are treated, to achieve the traffic steering in the preferred direction.

PCE

A PCE is a processing device that handles traffic engineering in Segment Routing. The official definition of a PCE is an entity (component, application, or network node) that is capable of computing a network path or route based on a network graph and applying computational constraints. The PCE is responsible for doing the path computation and then sending appropriate label-stack (SID labels) to the headend node. Then the headend node pushes those segments-list labels on the packets. For example, a PCE can handle bandwidth reservation as described in U.S. patent application Ser. No. 17/489,979, filed Sep. 30, 2021, and entitled "Handling bandwidth reservations with Segment Routing and Centralized PCE under real-time topology changes," the contents of which are incorporated by reference in their entirety. The present disclosure contemplates using these PCE bandwidth reservation techniques and provides a minimal SID list for rings based on the two Flex-Algo definitions.

Figure 7:
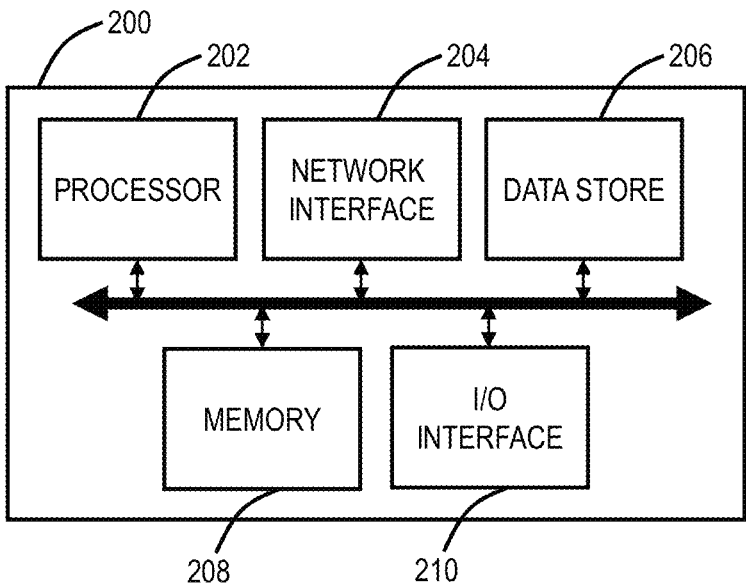
FIG. 7 is a block diagram of an example processing device.

Any PCE that can compute diverse and explicitly managed bandwidth paths can be used. PCE may have other features as well; such as support for affinity and other constraints. An example embodiment of a PCE is illustrated in FIG. 7. Note, the PCE can be a server, an application, a management system, a controller, etc.

PCE Path Computation Process

FIG. 4 is a flowchart of a process 60 implemented by a PCE for path computation and SID compression according to an embodiment of the present disclosure. The process 50 can be realized as a method having steps; via a processing system implementing a PCE or applications supporting PCE functionality, with the processing system including at least one processor configured to implement the steps; and as a non-transitory computer-readable medium storing instructions that, when executed by at least one processor, cause the at least one processor to implement the steps.

The process 60 includes grouping links on the computed path to the one or more rings they belong (step 61); for each of the one or more rings, determining a direction on an associated ring and assign the grouped links on the associated ring with a Flex-Algo SID for a final node in the determined direction on the associated ring (step 62); and providing a providing a SID list that includes the Flex-Algo SIDs for the one or more rings, to a source node in a Segment Routing network (step 63). By assigning the grouped links, we replace a SID for each node with a single Flex-Algo SID for the ring.

The process 60 can also include, prior to the grouping step 61, computing the path in the Segment Routing network, which includes the one or more rings, from the source node to a destination node (step 64). Of course, the process 60 can have the PCE provide SIDs for any other links on the computed path exclusive of the one or more rings. These would be provided as is known in the art; the present disclosure focuses on minimal SID lists for rings. Further, the process 60 can include managing bandwidth reservation in the Segment Routing network over the chosen links (step 65). Of note, the single SID via one of the two Flex-Algo definitions guarantees traffic flow in a single direction on the ring, so the PCE can compute paths and perform bandwidth reservation, traffic engineering, diversity, etc. That is, use of the single SID via one of the two Flex-Algo allows the PCE to guarantee a path.

End-to-End Service Path Over Ring of Ring Topologies

Figure 5:
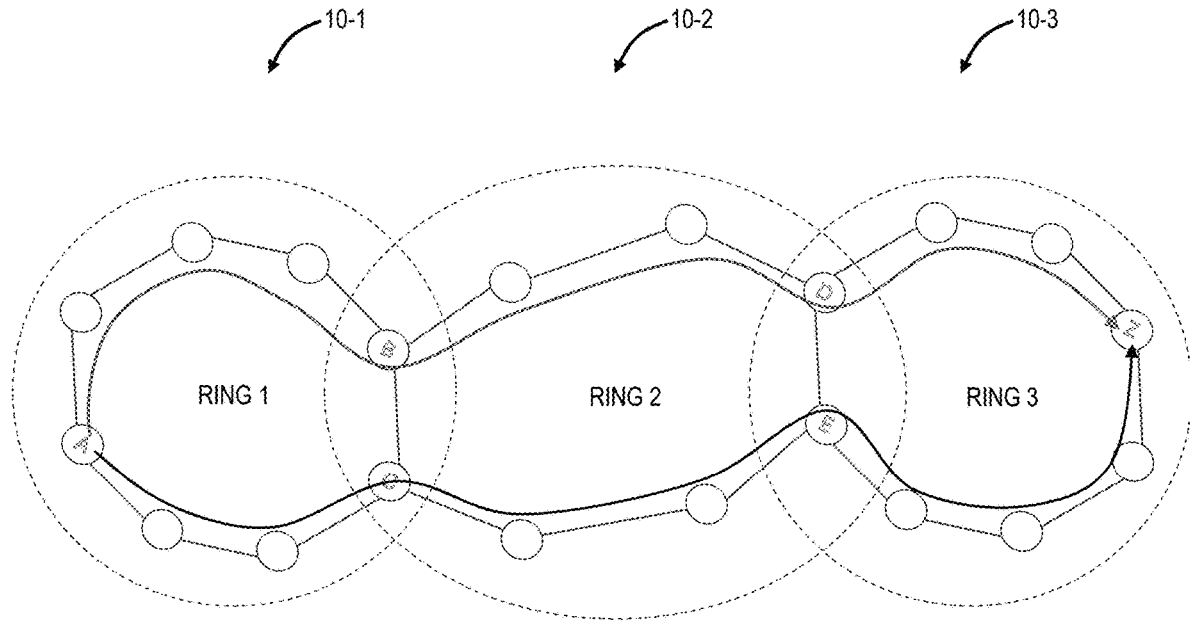
FIG. 5 is a network diagram of multiple interconnected rings illustrating use of the Flex-Algo prefix SID defined herein.

FIG. 5 is a network diagram of multiple interconnected rings 10-1, 10-2, 10-3, illustrating use of the Flex-Algo prefix SID defined herein. As described above, the present disclosure allows a guaranteed path in a ring with a single SID; this can be used in TE for bandwidth reservation. Also, the present disclosure can work, i.e., compress SID lists, in hybrid ring paths. The resulting SID list will have a depth length identical to the number of rings crossed plus non-ring links/nodes if needed.

FIG. 5 illustrates end-to-end SID lists for two diverse paths between node A and node Z using the two Flex-Algos for each of the rings 10-1, 10-2, 10-3. For example, for a candidate path 1 from A to Z that traverses the top of each of the rings 10-1, 10-2, 10-3, the SID list would be B1, D1, Z1, i.e., clockwise in each ring 10-1, 10-2, 10-3 to the final node in each ring 10-1, 10-2, 10-3. For a candidate path 2 from A to Z that traverse the bottom of each ring 10-1, 10-2, 10-3, the SID list would be C2, E2, Z2, i.e., counterclockwise in each ring 10-1, 10-2, 10-3.

Note that each ring 10-1, 10-2, 10-3 can be an IGP area, or an IGP domain. There is no requirement that all rings 10-1, 10-2, 10-3 are in a single IGP area because the end-to-end path is computed by the PCE which has visibility into all areas. And the nodes on a ring 10-1, 10-2, 10-3 only needs to have visibility to the nodes that are in the same ring 10-1, 10-2, 10-3. Also note that, shared routers will have two SIDs per ring that they belong. For example, B and C above will have total of 4 SIDs each (2 for two directions times 2 for two rings 10-1, 10-2 they are in).

Example Node

FIG. 6 is a block diagram of an example implementation of a router 100. Those of ordinary skill in the art will recognize FIG. 6 is a functional diagram in an oversimplified manner, and a practical embodiment may include additional components and suitably configured processing logic to support known or conventional operating features that are not described in detail herein.

In an embodiment, the router 100 can be any network element or other implementations that support SR networking. In this embodiment, the router 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the router 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the router 100 out by the correct port 108 to the next router 100. "Switching fabric" includes switching/routing units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the router 100. The network interface may be utilized to communicate with an element manager, a network management system, a PCE, etc. Additionally, the control module 104 can include a database that tracks and maintains provisioning, configuration, operational data, and the like.

Again, those of ordinary skill in the art will recognize the router 100 can include other components which are omitted for illustration purposes, and that the systems and methods described herein are contemplated for use with a plurality of different network elements with the router 100 presented as an example type of network element. For example, in another embodiment, the router 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 6 is meant to provide a functional view, and those of ordinary skill in the art will recognize actual hardware implementations may vary.

Example Controller

FIG. 7 is a block diagram of an example processing device 200. The processing device 200 can be part of the router 100, or a stand-alone device communicatively coupled to the network element 100, such as a PCE. Also, the processing device 200 can be referred to in implementations as a control module, a shelf controller, a shelf processor, a system controller, etc. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, or the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof.

Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

Conclusion

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections may include headers for various embodiments and those skilled in the art will appreciate these various embodiments may be used in combination with one another as well as individually. Further, it is noted that the various elements, operations, steps, methods, processes, algorithms, functions, techniques, etc. described herein can be used in any and all combinations with one another.

What is claimed is:

1. A non-transitory computer-readable medium comprising instructions that, when executed, cause one or more processors, for a Segment Routing network including a plurality of nodes, to perform steps of:
 defining a first Flexible Algorithm having one or more first constraints for links in a ring to force traffic to flow in a first direction around the ring;
 defining a second Flexible Algorithm having one or more second constraints for the links in the ring to force traffic to flow in a second direction around the ring, wherein the second direction is an opposite direction from the first direction; and
 computing, via a control plane that includes a Path Computation Element (PCE), Traffic-Engineering paths in the Segment Routing network and assigning corresponding Segment Identifiers (SIDs) for the first and second Flexible Algorithms, each SID being used by routers in a forwarding plane to direct packets in the respective direction around the ring.

2. The non-transitory computer-readable medium of claim 1, wherein the one or more first constraints and the one or more second constraints utilize link affinities.

3. The non-transitory computer-readable medium of claim 2, wherein the link affinities for a given link are the same for each of the first Flexible Algorithm and the second Flexible Algorithm, and wherein each of the first Flexible Algorithm and the second Flexible Algorithm applies opposite affinity constraints such that the first Flexible Algorithm includes the given link affinity in path computation and the second Flexible Algorithm excludes the given link affinity from path computation, or vice versa.

4. The non-transitory computer-readable medium of claim 1, wherein the one or more first constraints and the one or more second constraints are Traffic Engineering (TE) link metrics that are defined separately for each of the first Flexible Algorithm and the second Flexible Algorithm.

5. The non-transitory computer-readable medium of claim 4, wherein, in a first direction, the TE link metrics are assigned a nominal value, and, in a second direction, the TE link metrics are assigned an arbitrarily high value or omitted.

6. The non-transitory computer-readable medium of claim 1, wherein each of the plurality of nodes in the ring are configured to advertise associated attributes, for the one or more first constraints and the one or more second constraints, of locally attached links, to other nodes in the ring.

7. The non-transitory computer-readable medium of claim 1, wherein the steps further include
 configuring each of the plurality of nodes with one or more of the first Flexible Algorithm using the one or more first constraints and the second Flexible Algorithm using the one or more second constraints.

8. The non-transitory computer-readable medium of claim 1, wherein the steps further include
 configuring each of the plurality of nodes with corresponding Segment Identifiers for each of the first Flexible Algorithm and the second Flexible Algorithm.

9. A method, associated with a Segment Routing network including a plurality of nodes in a ring, the method comprising steps of:
 defining a first Flexible Algorithm having one or more first constraints for links in a ring to force traffic to flow in a first direction around the ring, wherein the ring is formed by a plurality of nodes included in a Segment Routing network;
 defining a second Flexible Algorithm having one or more second constraints for the links in the ring to force traffic to flow in a second direction around the ring, wherein the second direction is an opposite direction from the first direction; and
 computing, via a control plane that includes a Path Computation Element (PCE), Traffic-Engineering paths in the Segment Routing network and assigning corresponding Segment Identifiers (SIDs) for the first and second Flexible Algorithms, each SID being used by routers in a forwarding plane to direct packets in the respective direction around the ring.

10. The method of claim 9, wherein the one or more first constraints and the one or more second constraints utilize link affinities.

11. The method of claim 10, wherein the link affinities for a given link are the same for each of the first Flexible Algorithm and the second Flexible Algorithm, and wherein each of the first Flexible Algorithm and the second Flexible Algorithm applies opposite affinity constraints such that the first Flexible Algorithm includes the given link affinity in path computation and the second Flexible Algorithm excludes the given link affinity from path computation, or vice versa.

12. The method of claim 9, wherein the one or more first constraints and the one or more second constraints are Traffic Engineering (TE) link metrics that are defined separately for each of the first Flexible Algorithm and the second Flexible Algorithm.

13. The method of claim 12, wherein, in a first direction, the TE link metrics are assigned a nominal value, and, in a second direction, the TE link metrics are assigned an arbitrarily high value or omitted.

14. The method of claim 9, wherein each of the plurality of nodes in the ring are configured to advertise associated attributes, for the first constraints and the second constraints, of locally attached links, to other nodes in the ring.

15. The method of claim 9, wherein the steps further include configuring each of the plurality of nodes with one or more of the first Flexible Algorithm using the one or more first constraints and the second Flexible Algorithm using the one or more second constraints.

16. The method of claim 9, wherein the steps further include configuring each of the plurality of nodes with corresponding Segment Identifiers for each of the first Flexible Algorithm and the second Flexible Algorithm.

17. The method of claim 16, wherein configuring each of the plurality of nodes with corresponding Segment Identifiers comprises configuring, for each node in the ring, a first prefix Segment Identifier bound to the first Flexible Algorithm and a second prefix Segment Identifier bound to the second Flexible Algorithm, such that a path across the ring is representable with a single prefix Segment Identifier per ring in a selected direction.

18. The method of claim 9, wherein inclusion and exclusion rules based on link affinities comprise a Boolean combination that includes links having a preferred affinity and excludes links having a non-preferred affinity for the first Flexible Algorithm, and includes links having the non-preferred affinity and excludes links having the preferred affinity for the second Flexible Algorithm.

19. The method of claim 9, wherein the one or more first constraints and the one or more second constraints comprise Traffic Engineering (TE) link metrics, and wherein, for a given Flexible Algorithm, TE link metrics assigned in an opposite direction comprise a maximum link metric value that is greater than any end-to-end path metric across the Segment Routing network, such that reverse-direction links are not selected absent a fault.

20. The method of claim 9, wherein the one or more first constraints and the one or more second constraints comprise Traffic Engineering (TE) link metrics, and wherein assigning TE link metrics to be omitted in an opposite direction comprises withholding advertisement of TE link metrics for reverse-direction links for a given Flexible Algorithm, thereby preventing shortest-path computation from using the reverse-direction links for that Flexible Algorithm.

\* \* \* \* \*